US012675290B2

(12) United States Patent
Donthireddy et al.

(10) Patent No.: US 12,675,290 B2
(45) Date of Patent: Jul. 7, 2026

(54) TELECOMMUNICATION ASSET DECOMPOSITION AND QUALITY SCORING SYSTEMS AND METHODS

(71) Applicant: T-Mobile USA, Inc., Bellevue, WA (US)

(72) Inventors: Venkata Reddy Donthireddy, Sammamish, WA (US); Sanker Nallusamy, Redmond, WA (US); Priyank Kumar Singh, Snohomish, WA (US); Karan Singla, Vancouver (CA)

(73) Assignee: T-Mobile USA, Inc., Bellevue, WA (US)

( * ) Notice: Subject to any disclaimer, the term of this patent is extended or adjusted under 35 U.S.C. 154(b) by 1035 days.

(21) Appl. No.: 17/859,486

(22) Filed: Jul. 7, 2022

(65) Prior Publication Data

US 2024/0012643 A1 Jan. 11, 2024

(51) Int. Cl.
G06F 8/77 (2018.01)
H04L 41/044 (2022.01)
H04L 43/08 (2022.01)

(52) U.S. Cl.
CPC .............. G06F 8/77 (2013.01); H04L 41/044 (2013.01); H04L 43/08 (2013.01)

(58) Field of Classification Search
CPC ......... G06F 8/77; H04L 41/044; H04L 43/08; H04L 41/22; H04L 41/5009; H04L 41/16
See application file for complete search history.

(56) References Cited

U.S. PATENT DOCUMENTS

| | | | | |
|---|---|---|---|---|
| 10,511,690 | B1 * | 12/2019 | Chatterjee | .............. H04L 41/149 |
| 10,630,598 | B1 * | 4/2020 | Kowalski | ................ H04L 47/70 |
| 11,108,651 | B1 * | 8/2021 | Mermoud | ............... H04L 43/16 |
| 11,550,695 | B2 * | 1/2023 | Vlachogiannis | .... G06F 11/3409 |
| 2021/0081836 | A1 * | 3/2021 | Polleri | ....................... G06F 8/77 |
| 2021/0326239 | A1 * | 10/2021 | Vaughan | ................... G06F 8/77 |
| 2022/0239720 | A1 * | 7/2022 | Madanapalli | ....... H04L 43/0876 |
| 2023/0012609 | A1 * | 1/2023 | Wang | .................... H04L 43/028 |
| 2023/0022959 | A1 * | 1/2023 | Dasgupta | ............ H04L 41/5025 |
| 2023/0367590 | A1 * | 11/2023 | Shivanna | .................. G06F 8/77 |

* cited by examiner

*Primary Examiner* — Javier O Guzman
(74) *Attorney, Agent, or Firm* — Perkins Coie LLP

(57) ABSTRACT

Systems and methods for decomposing telecommunication assets and generating asset quality scores are disclosed. Parameters are received for a telecommunication asset, including a location and/or access credentials. An asset group is identified for the telecommunication asset, such as an asset group associated with an operational unit or activity of a telecommunication service provider. One or more deployable units are received for inclusion in the telecommunication asset. Using the telecommunication asset parameters, the asset group, and the one or more deployable units, a hierarchical representation of the telecommunication asset is generated to facilitate management of the telecommunication asset. In some implementations, a quality score is generated for the telecommunication asset, such as a score generated using a trained machine learning model.

20 Claims, 7 Drawing Sheets

300

600

TELECOMMUNICATION ASSET DECOMPOSITION AND QUALITY SCORING SYSTEMS AND METHODS

BACKGROUND

Organizations, such as telecommunication service providers, acquire and utilize various assets, including software assets. Management of assets can include purchasing, deploying, maintaining, utilizing, and disposing of assets. Asset management can include software asset management, which relates to inventorying software assets, managing licenses, controlling access and use of software assets, installing and updating software assets, procuring and deploying software assets, assessing performance and quality of assets, and so forth.

BRIEF DESCRIPTION OF THE DRAWINGS

Detailed descriptions of implementations of the present invention will be described and explained through the use of the accompanying drawings.

Figure 1:
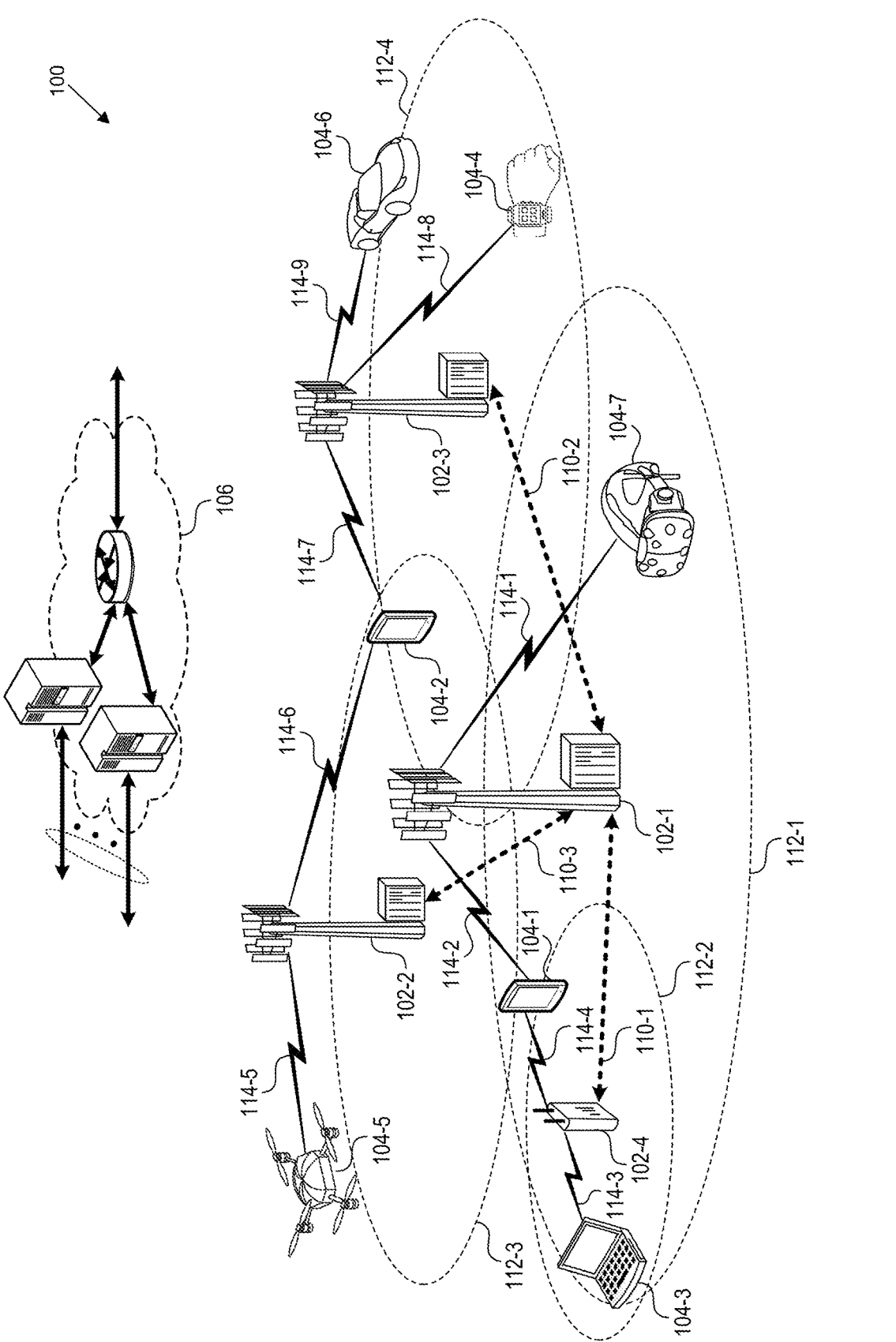
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunication service providers face difficult technical challenges related to management of telecommunication assets, such as software assets. As used herein, a "telecommunication asset" includes, but is not limited to, a software application, a website, a data store (e.g., a database), an external system or service (e.g., cloud-based service), or a software platform. These and other assets can be developed internally by a telecommunication service provider and/or provided via a vendor or other third party. Telecommunication service providers manage telecommunication assets and/or components of telecommunication assets, for example, to assess performance and quality, to deploy and monitor assets, to detect operational status (e.g., outages), and/or to track specific instances of telecommunication assets or components of telecommunication assets.

Existing asset management systems typically rely on asset inventory databases that track assets using a flat structure that does not adequately allow for management of components of a telecommunication asset, such as deployable units included in a telecommunication asset and/or instances of deployable units that are deployed (e.g., on one or more user devices or servers). Existing systems, thus, do not organize assets in a way that reflects the hierarchical arrangement of assets, which may be associated with one or more asset groups (e.g., grouped according to a business unit or operational unit of a telecommunication service provider), and comprised of one or more deployable units that each provide specific functional and/or non-functional features of an asset. Therefore, little or no information is typically available about lifecycles, changes, updates, dependencies, or other attributes of specific deployable units included in a telecommunication asset. Furthermore, existing systems do not allow for tracking and management of deployable instances of deployable units of an asset, such as tracking of hardware infrastructure where deployable instances are deployed within an organization. Additionally, existing systems do not allow for quick and simple assessments of performance or quality of software assets and/or components of software assets, such as assessments of an asset's effect on revenues.

Accordingly, there is a need for a technical solution that overcomes the foregoing problems and provides additional benefits. For example, there is a need for a solution that allows a software asset to be decomposed into one or more deployable units that can each be managed and monitored. Furthermore, there is a need for a solution that allows for assets to be managed hierarchically, based on asset groups, deployable units, and/or deployable instances of deployable units. Additionally, there is a need for a solution that generates quality scores representing an overall quality of an asset and/or a deployable unit, such as quality scores based on decomposition of an asset, operational status, and/or impacts to revenue-generating activities of a telecommunication service provider.

Disclosed herein are systems and related methods that decompose telecommunication assets based on one or more hierarchies and facilitate management of the decomposed telecommunication assets ("system" or "telecommunication asset management system"), such as by generating quality scores for the decomposed assets. The system receives, at a graphical user interface (GUI), an asset type for a telecommunication asset. The asset type can be, for example, a software application, a software platform, a website, or a data store. One or more input fields are displayed in the GUI, based on the received asset type, each input field corresponding to a parameter for the telecommunication asset. The one or more parameters can include a location where the asset can be accessed (e.g., an endpoint or uniform resource locator (URL)) and/or access parameters for the telecommunication asset. Via the one or more input fields, the system receives the one or more parameters for the telecommunication asset. The system further receives hierarchical information for the telecommunication asset, the hierarchical information including an asset group for the telecommunication asset. The asset group relates to a unit of a telecommunication service provider that uses the asset, such as a department or business unit. The system also receives and/or accesses one or more deployable units that are included in the telecommunication asset. A deployable unit can be, for example, a user interface (UI) component, a services component, a database component, a microservice, or an application programming interface (API). The system generates a hierarchical representation of the asset using the received asset type, the parameters for the telecommunication asset, the hierarchical information, and the one or more deployable units included in the telecommunication asset. The hierarchical representation of the asset can then be used to manage the asset, such as by providing access to asset data via an API, providing access to deployable units via an API, and/or generating quality scores for the asset and/or the one or more deployable units.

To generate quality scores for assets and/or deployable units, the system trains one or more machine learning models. To train the one or more machine learning models, the system receives data related to multiple telecommunication assets, including a hierarchy associated with at least some of the assets. The hierarchy includes an asset group to which the asset belongs and one or more deployable units included in the asset. Additionally, each asset is associated with at least one quality score, the quality score reflecting, for example, whether the telecommunication asset is properly decomposed, an operational status for the telecommunication asset, outage information, and so forth. Using the data related to the multiple telecommunication assets, the system generates a training dataset based on at least one characteristic of the multiple telecommunication assets, such as an operational status of the telecommunication asset or the presence or absence of a hierarchical decomposition of an asset. The system trains a machine learning model using the generated training dataset to receive a telecommunication asset and generate a quality score for the telecommunication asset.

Advantages of the disclosed technology include the ability to more accurately and thoroughly manage and track telecommunication assets, such as by enabling management of groups of assets, individual assets, and individual deployable units within assets. Furthermore, the disclosed technology allows users to easily assess the quality and/or performance of assets and deployable units by providing quality scores, such as numerical scores, that quickly communicate an overall quality of an asset or a deployable unit. Additionally, the disclosed technology can be used to map assets to key business flows to better assess performance, minimize risk, and/or increase business value associated with assets.

For illustrative purposes, examples herein relate to decomposition and management of telecommunication assets used by a telecommunication service provider. However, a person skilled in the art will appreciate that the disclosed technology can be applied in any context where assets (e.g., software assets) are managed.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a G network 100 and/or an LTE/LTE-A or other network. In an LTE/LTE-A network, the term eNB is used to describe the base stations 102, and in G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Telecommunication Asset Management System

Figure 2:
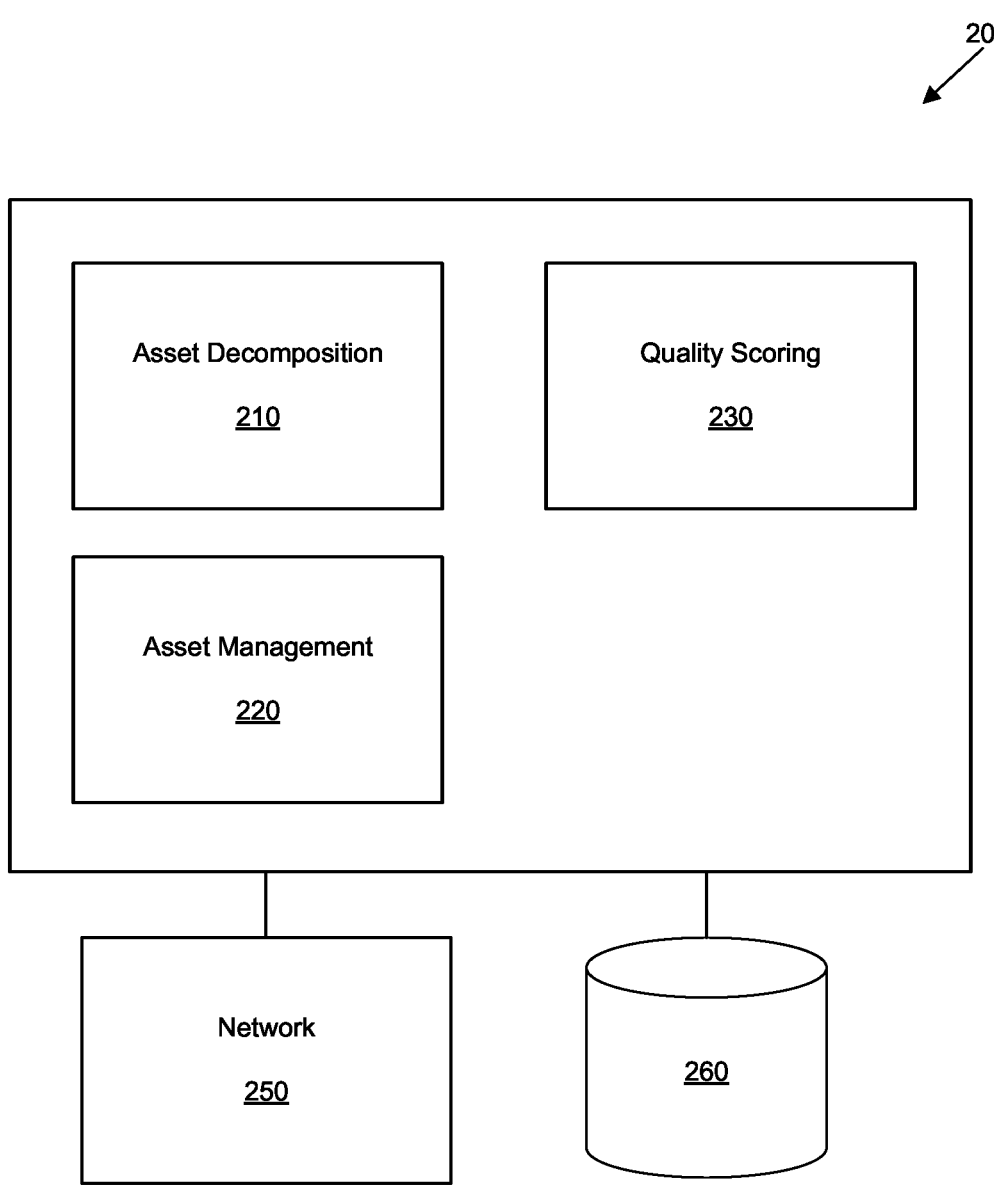
FIG. 2 is a block diagram that illustrates components of a telecommunication asset management system in some implementations.

FIG. 2 is a block diagram that illustrates components of a telecommunication asset management system 200 that decomposes and manages telecommunication assets and/or generates quality scores, in some implementations. All or portions of the system 200 can be provided, for example, by a telecommunications service provider that provides all or portions of the network 100 using one or more components of the network 100. The telecommunication asset management system 200 can include functional modules that are implemented with a combination of software (e.g., executable instructions or computer code) and hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The telecommunication asset management system 200 includes an asset decomposition module 210, an asset management module 220, and a quality scoring module 230, which are each discussed separately below. These and other modules of the system access data, such as telecommunication assets and/or training datasets, via a network component 250 and/or a storage component 260. The network component 250 is configured to communicate with external devices or entities, such as devices via which telecommunication assets, deployable units, and/or training datasets are accessed by the system 200. The storage component 260 comprises local storage, storage on a server system or on the cloud, or a combination thereof. The storage component 260 stores data for or used by the system 200, such as data related to telecommunication assets, deployable units, and/or training datasets to train one or more machine learning models.

Asset Decomposition Module

The asset decomposition module 210 receives information about assets and decomposes the assets using a hierarchical structure. In some implementations, the asset decomposition module 210 includes one or more interfaces, such as graphical user interfaces (GUIs), via which various asset information is received. To generate a new or modified asset via the asset decomposition module 210, a user provides an asset name and an asset type. The asset type can be, for example, a software application, a software platform, a data store, a website, or an external system or service. Each asset includes one or more parameters, such as a location and/or access credentials. Furthermore, assets can be associated with one or more asset groups, such as groups associated with a unit or activity of a telecommunication service provider (e.g., a department, a business unit, or a business activity). Additionally, each asset includes at least one deployable unit, such as a software module or microservice, an API, or a database component. Assets can further include one or more deployable instances for at least some of the deployable units, such as instances of a deployable unit that are deployed in specific environments and/or on specific hardware components. Using the asset name, the asset type, the asset group, the deployable unit(s), and/or the deployable instance(s), the asset decomposition module generates a hierarchical representation of the asset, which can then be managed using the asset management module 220. For example, attributes of the asset and/or its deployable units and/or deployable instances can be tracked and monitored throughout their respective lifecycles, including repository associations, updates and/or changes, dependencies, endpoints, security changes, code analysis, testing, and/or specific deployments. A non-limiting example of the different levels of the hierarchical representation is illustrated in Table 1 below.

TABLE 1

| Hierarchy Level | Description |
|---|---|
| Level 1 (Asset Group) | At Level 1, an asset is associated with an asset group, which is based on a unit (e.g., a department or business unit) of an organization and/or a business activity. Examples of asset groups include sales, information technology, or software development. |
| Level 2 (Asset) | Level 2 is the asset, such as the software platform, data store, software application, and/or external system or service. |
| Level 3 (Deployable Units) | Level 3 comprises the deployable units included in the asset. |

Asset Management Module

The asset management module 220 manages decomposed assets generated by the asset decomposition module 210. Managing telecommunication assets can include tracking and monitoring the entire lifecycle of an asset, such as repository associations, updates and changes, dependencies, endpoints, security changes, code analysis, testing, and/or deployments. In some implementations, the asset management module 220 includes one or more interfaces or dashboards via which assets and/or deployable units can be managed. The hierarchical representations generated using the asset decomposition module 210 allow for management of assets based on business activities and/or units of an organization, as well as based on physical and/or digital infrastructure of the organization. For example, each asset can be associated with categories of revenue-generating activities of the organization, and managing the asset can thus take into account the impact of an asset on these revenue-generating activities. Additionally, assets and/or deployable units can be tracked based on physical components and/or digital environments where they are deployed.

In some implementations, the asset management module 220 allows users to access various data about decomposed assets, such as via an API. For example, the asset management module 220 can provide data related to asset health or quality, locations of deployable instances, version information, hierarchical information, and so forth. Additionally or alternatively, the asset management module 220 can allow users to access deployable units within decomposed asset via an API.

In some implementations, the asset management module 220 can improve security and/or stability for a telecommunication service provider. For example, the asset management module 220 can restrict the ability to install or deploy assets or deployable units based on the status of the assets or deployable units, as tracked via the asset management module 220. The asset management module 220 can, for example, prevent installation or deployment of assets and deployable units that are not properly decomposed and tracked within the system 200.

Quality Scoring Module

The quality scoring module 230 trains and/or provides one or more machine learning models to generate quality scores for telecommunication assets and/or deployable units of telecommunication assets. The quality scores can be based on, for example, an operational status of the asset and/or deployable units in the asset, whether an asset is properly decomposed, and/or a positive or negative impact of the asset on business activities (e.g., revenue-generating activities) of the telecommunication service provider). In some implementations, multiple models can be trained to generate quality scores based on different quality metrics and the multiple models can be combined to generate an aggregate quality score representing an overall quality of the asset. Quality scores can be, for example, numerical scores or ranges associated with attributes of assets and/or deployable units, as illustrated in Table 2 below.

TABLE 2

| Quality Score | Asset/Deployable Unit Characteristics |
|---|---|
| 0-400 (Poor) | The asset is not properly decomposed (e.g., is not associated with an asset group and/or lacks deployable units) and/or the asset or one or more deployable units are performing poorly or having negative impacts on business activities (e.g., the asset or a deployable unit is down or providing slow or inconsistent performance). |
| 401-700 (Fair) | The asset is partially decomposed (e.g., may lack only an asset group or a deployable unit) and/or the asset or one or more deployable units have minor performance issues (e.g., the asset and/or a deployable unit are performing properly but slowly). |
| 701-1000 (Good) | The asset is properly decomposed and performing well (e.g., based on speed, functionality, and/or impacts in relation to business activities). |

To train the one or more machine learning models, the quality scoring module 230 generates one or more training datasets. The quality scoring module 230 receives asset data related to multiple telecommunication assets, including a quality score for each of the multiple telecommunication assets representing a quality of the telecommunication asset, such as based on the scale illustrated in Table 2 above. The asset data can also include hierarchies associated with each asset, if present, such as whether the asset is associated with an asset group and/or one or more deployable units. Additionally or alternatively, the asset data can include an operational status of the asset. Using the received asset data, the quality scoring module 230 generates the one or more training datasets, which are used to train the one or more machine learning models. The one or more machine learning models are trained to receive data associated with a new asset, such as an operational status and an asset hierarchy, and generate a quality score based on the operational status and/or the asset hierarchy, such as a quality score based on the scale illustrated in Table 2 above.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the quality scoring module 230 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to assess quality of assets and/or deployable units, and so forth. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new telecommunication assets.

Decomposing Assets

Figure 3A:
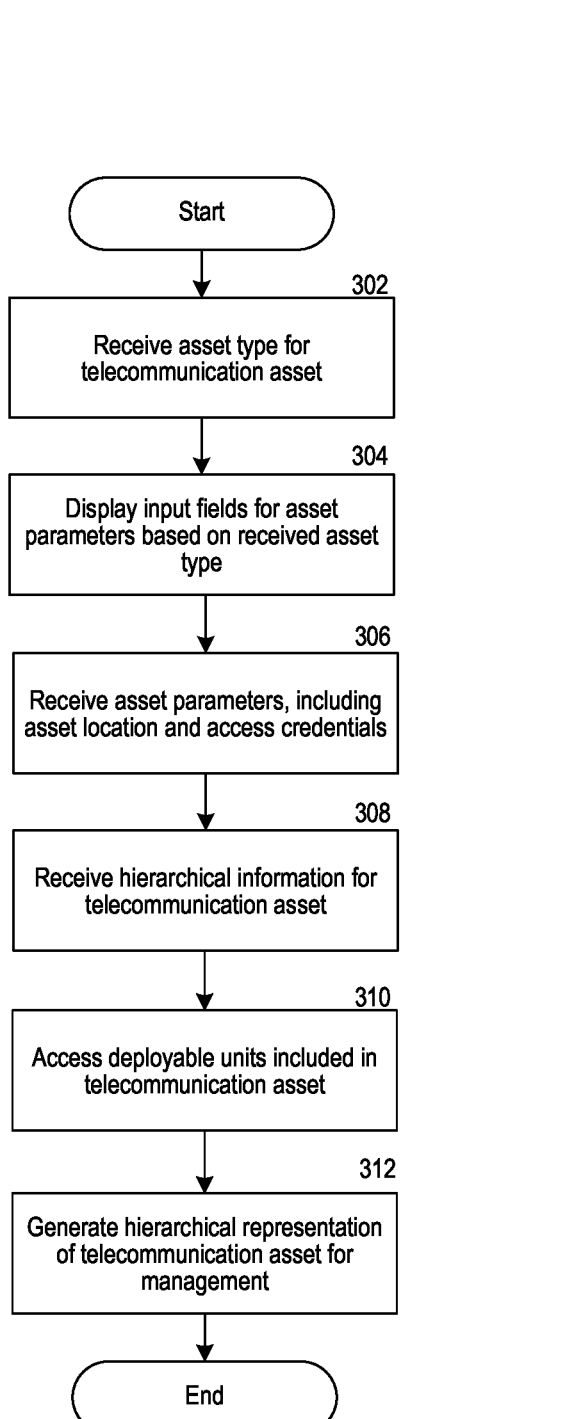
FIG. 3A is a flow diagram that illustrates a process to decompose a telecommunication asset in some implementations.

FIG. 3A is a flow diagram that illustrates a process 300 for decomposing a new or modified telecommunication asset. The process 300 can be performed, for example, using a telecommunication asset management system, such using the asset decomposition module 210 of the system 200 of FIG. 2. All or portions of the process 300 can be performed using one or more interfaces, such as the interface 320 of FIG. 3B.

The process 300 begins at block 302, where the system receives an asset type for a telecommunication asset. The asset type can be, for example, a software application, a data store, a software platform, or an external system or service. The asset type can be received from a user, for example, by selecting from a set of predetermined asset types.

The process 300 proceeds to block 304, where one or more input fields are displayed for receiving asset parameters for the telecommunication asset. The input fields can be dynamically displayed in response to the asset type received at block 302. The asset parameters can be, for example, locations and/or access credentials for the asset.

The process 300 proceeds to block 306, where the asset parameters are received via the one or more displayed input fields.

The process 300 proceeds to block 308, where hierarchical information is received for the telecommunication asset, including an asset group for the telecommunication asset. As described herein, the asset group can correspond to a unit of a telecommunications service provider, such as a business unit or department, and/or a category of activities (e.g., revenue-generating activities) for the telecommunication service provider.

The process 300 proceeds to block 310, where deployable units are accessed and/or received by the system. Each deployable unit is a component of the asset that provides specific functionality. A deployable unit can be, for example, a microservice, a database component, an API, or an application component. Receiving a deployable unit can include receiving software code that is uploaded to the system or receiving access credentials for the deployable unit.

The process 300 proceeds to block 312, where a hierarchical representation of the telecommunication asset is generated. The hierarchical representation associates the asset with the asset group and the deployable units, such that the asset and/or the deployable units can be managed in relation to the hierarchy associated with the asset.

All or portions of the process 300 can be performed in any order, including performing one or more operations in parallel. Additionally, operations can be added to or removed from the process 300 without deviating from the teachings of the present disclosure.

In some implementations, the process 300 includes further operations to manage the decomposed asset and/or the deployable units. For example, the process 300 can include generating a quality score for the decomposed asset using one or more machine learning models, as described herein.

Once an asset is decomposed, the status of the asset and its deployable units continues to be tracked by the system using the hierarchical representation of the asset. For example, the system monitors the operational status of the asset and/or the deployable units to detect outages or performance issues. The system tracks updates to the assets and the deployable units. The system also updates the quality score for the asset. The disclosed system can monitor and/or track assets and/or deployable units using monitoring data received from the assets and/or deployable units. Monitoring data can be received continuously and/or at regular or irregular intervals (e.g., hourly, daily, weekly). The system can provide alerts and/or notifications based on the received monitoring data, such as alerts or notifications related to outages, performance issues, changes in performance scores, changes in assets, deployable units, and/or deployable instances, and so forth.

Figure 3B:
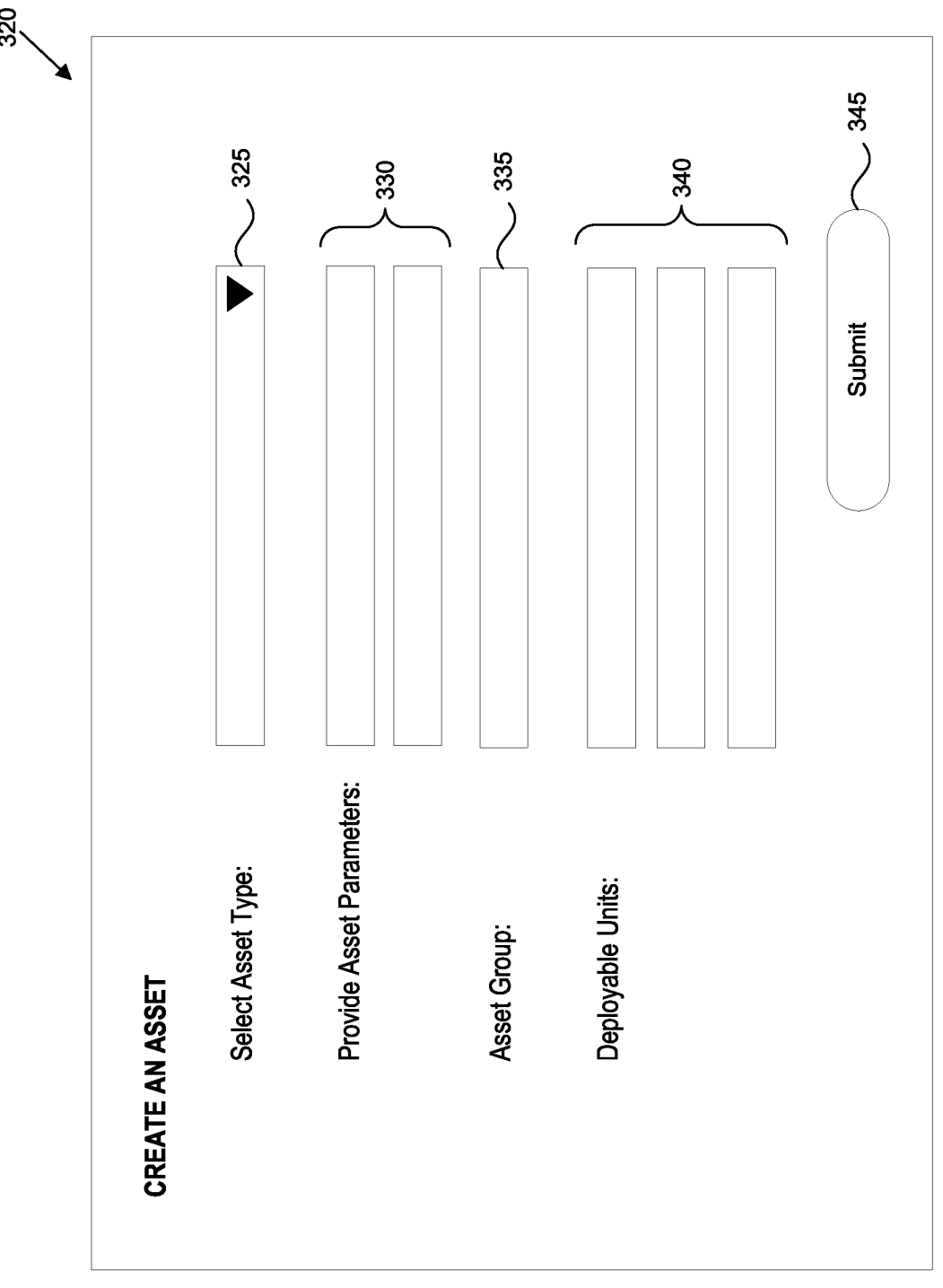
FIG. 3B is a display diagram that illustrates an interface generated by a telecommunication asset management system in some implementations.

FIG. 3B is a display diagram that illustrates an interface 320 provided by the system to generate hierarchical representations of telecommunication assets, in some implementations. The interface 320 can be provided, for example, via the asset decomposition module 210 of the system 200 of FIG. 2, and can be used to perform at least a portion of the process 300.

The interface 320 includes an input field 325 for receiving an asset type for a new asset. For example, the system detects that a user has selected the input field 325 (e.g., by clicking), and displays a dropdown menu (not shown) that includes multiple selectable asset types from which the user can choose, such as a software application, a software platform, an API, a data store, or an external system or service.

In response to receiving the selection of the asset type at input field 325, the system dynamically displays one or more input fields 330 for parameters for the asset. The number and type of input fields 330 depends on the asset type received via input field 325. For example, if the selected asset type is a software application, then at least two input fields are displayed for a location where the asset can be accessed (e.g., a URL) and for access credentials to access the asset.

The interface 320 also includes an input field 335 for receiving an asset group for the asset. The asset group can be associated with, for example, a business unit or department of a telecommunications service provider and/or a category of business activities.

Additionally, the interface 320 includes one or more input fields 340 for receiving deployable units for inclusion in the asset.

The interface 320 also includes a submit button 345 for submitting the inputs received at input fields 325, 330, 335, and 340 to the telecommunication asset management system. In response to receiving the inputs, the system generates a hierarchical representation of the telecommunication asset for management via the system.

Although interface 320 is depicted as a single interface, additional interfaces can be used without deviating from the teachings of the present disclosure, such as a series of interfaces for receiving the asset type, the asset parameters, the asset group, and/or the deployable units. Additionally, the interface 320 can include additional items not shown in FIG. 3B, such as a field for receiving an asset name, a field for receiving an asset description, and/or additional fields for asset-related information.

Manacling Telecommunication Assets

Figure 4:
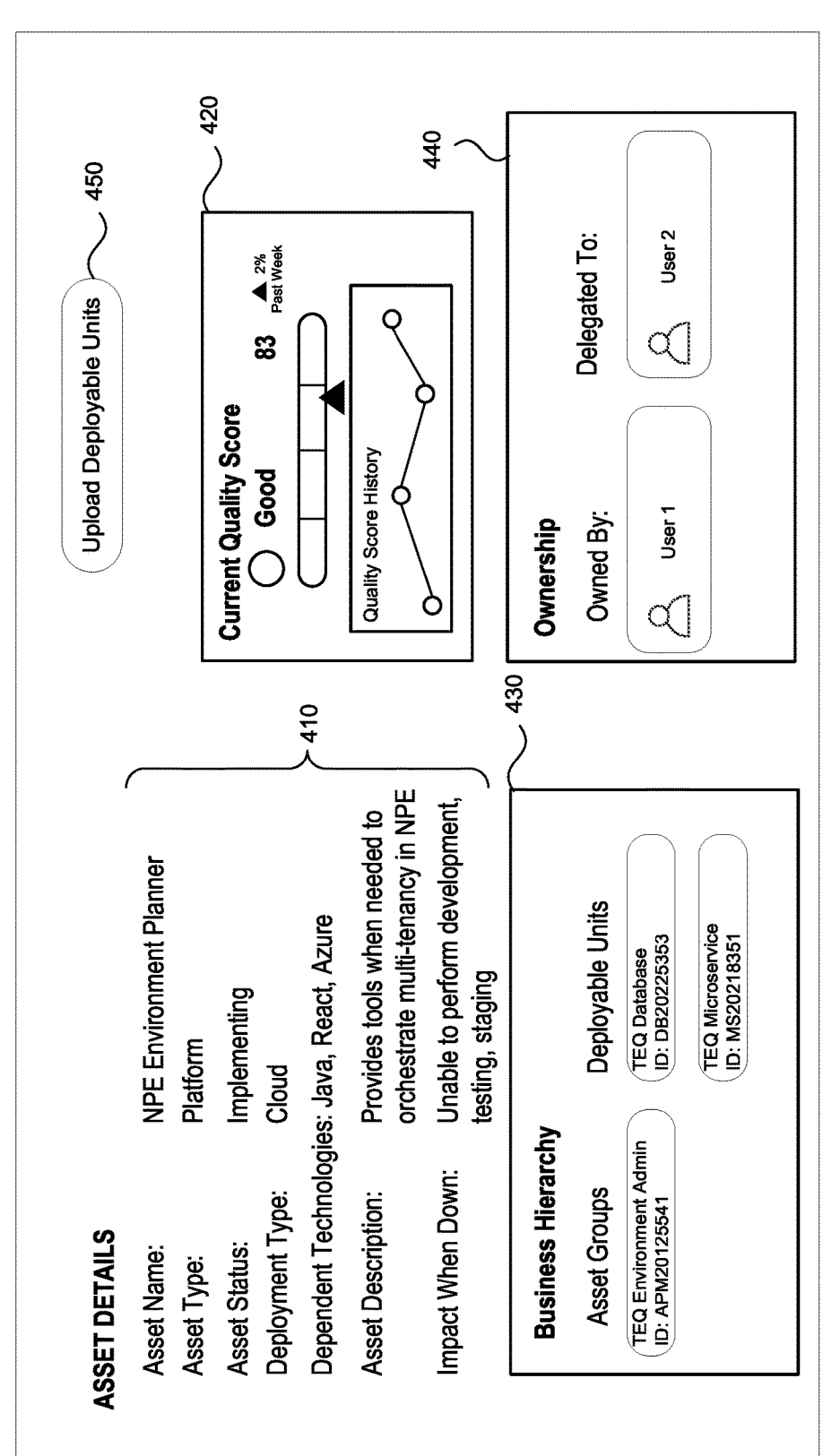
FIG. 4 is a display diagram that illustrates an detail page generated by a telecommunication asset management system in some implementations.

FIG. 4 is a display diagram that illustrates a detail page 400 provided by the system to manage a telecommunication asset via the system. The detail page 400 includes details for a telecommunication asset managed via the system, such as an asset generated via the process 300 and/or using the interface 320.

The detail page includes asset details 410, such as an asset name, an asset type, an asset status, a deployment type, dependent technologies, an asset description, and/or a description of impacts to a telecommunication service provider that uses the asset when the asset is down. In some implementations, the asset details 410 include business criticality of an asset (e.g., high, medium, low), which relates to the overall impact that the asset has on business operations.

In a quality scoring region 420 of the detail page 400, various quality information is displayed about the telecommunication asset, such as quality information generated using a machine learning model, as described herein. For example, the quality scoring region can indicate a numerical quality score for the telecommunication asset and/or a short descriptor of the quality score (e.g., poor, fair, good, etc.). In some implementations, the quality information can also be displayed using a color-coded indicator, such as a circle or other shape the color of which corresponds to different levels of quality (e.g., green for good, red for poor, yellow for fair). Additionally or alternatively, the quality information can include one or more indicators comparing a current quality score to one or more previous quality scores (e.g., on an hourly, daily, weekly, monthly, quarterly, or annual basis, etc.), such as an up or down arrow and a corresponding percentage by which the quality score has changed in comparison to the one or more previous quality scores. The quality information can also include a graph or chart indicating a quality score history (e.g., in the past day, week, month, quarter, year, etc.). In some implementations, the detail page 400 can provide additional information about a quality score, such as one or more factors affecting the quality score and/or suggestions for improving the quality score.

In a hierarchy region 430 of the detail page 400, information is displayed relating to a hierarchy in which the telecommunication asset is included. The telecommunication asset is assigned to an asset group associated with a unit within a telecommunications service provider, and information about the asset group is included in the hierarchy region 430, such as a name of the asset group and/or another identifier for the asset group. Additionally, the telecommunication asset includes at least one deployable unit, such as a microservice, a database, or an API, and information about the at least one deployable unit is displayed in the hierarchy region 430.

Additionally, in an ownership region 440 of the detail page 400, information is displayed relating to one or more user roles associated with the telecommunication asset, such as a user or team that owns the telecommunication asset, a user with delegated responsibility for the asset, one or more users that use the asset, and so forth. This role information ca be used for various purposes related to asset management, such as for providing notifications to users and/or submitting requests to users for changes to assets.

The detail page 400 also has an upload deployable units button 450, which allows a user to upload additional deployable units for an asset described in the detail page 400. When additional deployable units are uploaded using the button 450, the additional deployable units will appear in the hierarchy region 430. One or more characteristics of the detail page 400 can be automatically updated in response to uploading the additional deployable units, such as a quality score displayed in the quality scoring region 420.

Computing System

Figure 5:
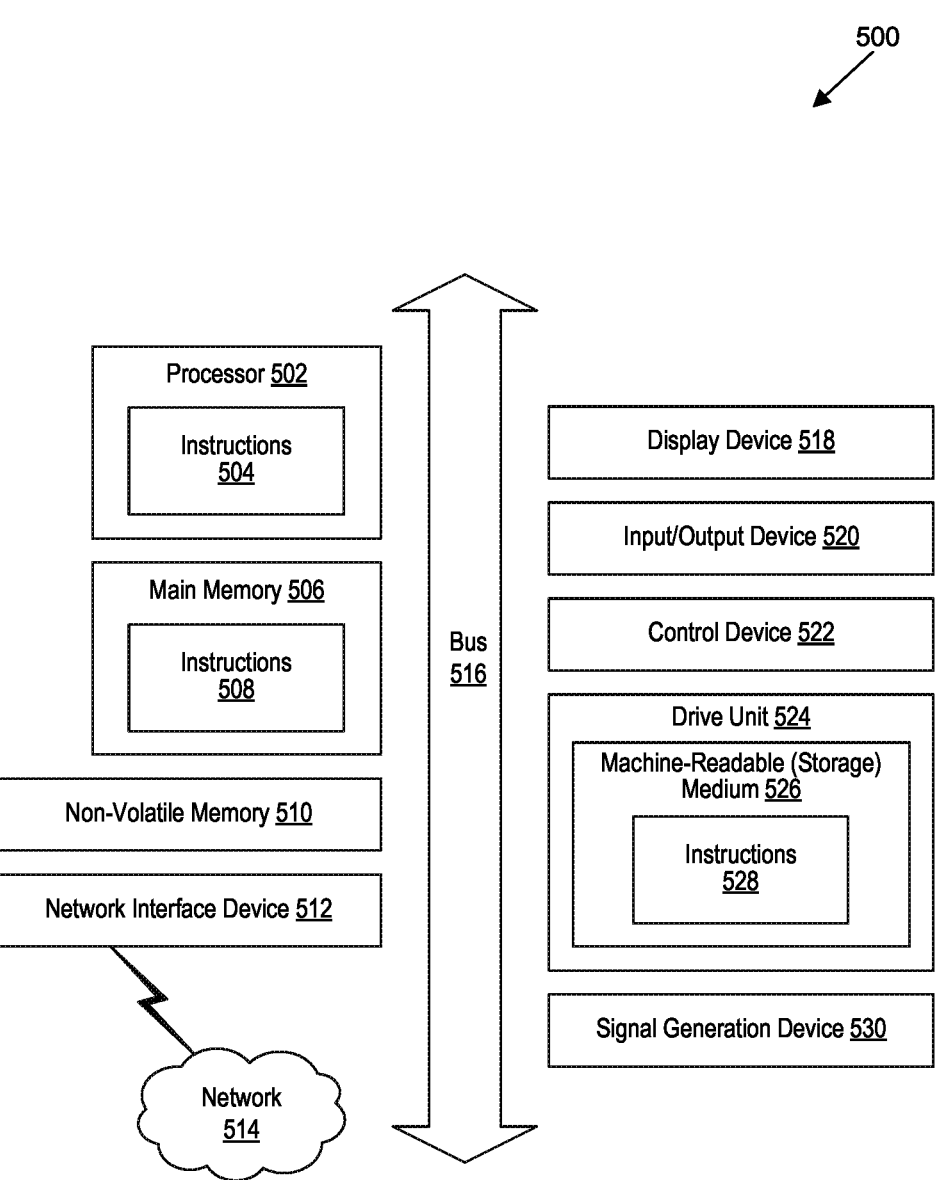
FIG. 5 is a block diagram that illustrates an example of a computer system in which at least some operations described herein can be implemented.

FIG. 5 is a block diagram that illustrates an example of a computing system 500 in which at least some operations described herein can be implemented. As shown, the computing system 500 can include: one or more processors 502, main memory 506, non-volatile memory 510, a network interface device 512, a display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computing system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Training a Machine Learning Model

Figure 6:
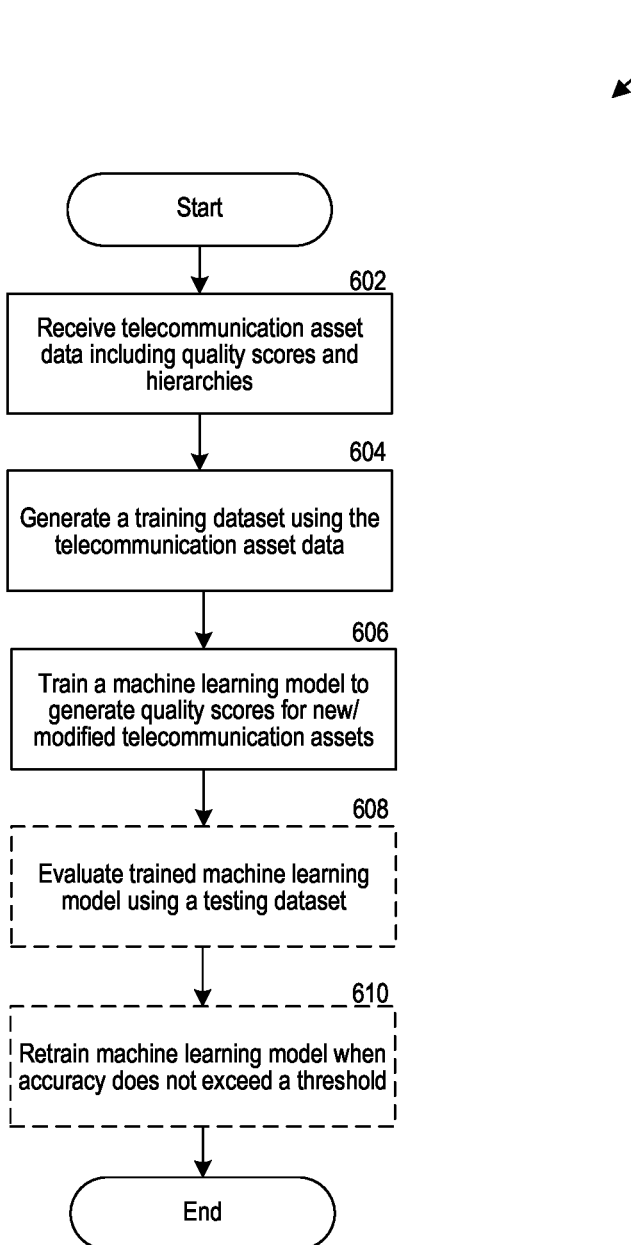
FIG. 6 is a flow diagram that illustrates a process to train a machine learning model in some implementations.

FIG. 6 is a flow diagram that illustrates a process 600 for training a machine learning model to generate quality scores for telecommunication assets to facilitate telecommunication asset management, in some implementations. The process 600 can be performed, for example, using a telecommunication asset management system, such using the quality scoring module 230 of the system 200 of FIG. 2.

The process 600 begins at block 602, where telecommunication asset data is received for multiple telecommunication assets. The telecommunication asset data includes a quality score for each of the multiple telecommunication assets representing a quality of the telecommunication asset, such as a quality score based on the scale illustrated in Table 2. The telecommunication asset data also includes, for at least some of the multiple telecommunication assets, a hierarchy that includes an asset group for the telecommunication asset and/or a set of deployable units included in the telecommunication asset. The multiple telecommunication assets can comprise a large number of telecommunication assets, such as hundreds or thousands of telecommunication assets.

The process 600 proceeds to block 604, where the received telecommunication asset data is used to generate a training dataset. To generate the training dataset, one or more characteristics of the multiple telecommunication assets are identified. For example, the training dataset can include characteristics relating to operational status of the telecommunication assets (e.g., whether the asset is down, slow, operating as expected, etc.) and/or presence or absence of a hierarchical decomposition of the telecommunication asset. In some implementations, generating the training dataset includes calculating one or more variables characterizing the multiple telecommunication asset, such as variables related to quality, performance, data usage, and/or changes in the foregoing characteristics.

The process 600 proceeds to block 606, where the generated training dataset is used to train a machine learning model to generate quality scores for telecommunication assets. Once the machine learning model has been trained using the process 600, the trained machine learning model can receive asset data for a telecommunication asset, such as a new or modified telecommunication asset, and generate a quality score for the telecommunication asset, such as a quality score based on the scoring scale illustrated in Table 2.

In some implementations, the process 600 proceeds to block 608, where the trained machine learning model is evaluated using a testing dataset. For example, in some implementations, a portion of the training dataset (e.g., 10%) generated at block 604 can be held back as testing data to be used to evaluate the trained machine learning model. The trained machine learning is applied to the test data to evaluate accuracy of the trained machine learning model. In some implementations, the trained machine learning model is evaluated periodically (e.g., daily, weekly, monthly, quarterly, yearly, etc.) and/or as needed to determine whether the accuracy of the model exceeds a threshold accuracy (e.g., 80%, 90%, 95%, etc.).

In some implementations, the process 600 proceeds to block 610, where the machine learning model is retrained, such as in response to determining at block 608 that the accuracy of the machine learning model does not exceed a threshold accuracy. Retraining the machine learning model can include training the machine learning model at least a second time using the same training dataset, training the machine learning model with a different (e.g., expanded) training dataset, applying different weightings to a training dataset, rebalancing a training dataset, and so forth.

Although the process 600 depicts training a single machine learning model, in some implementations multiple training machine learning models can be trained. For example, the process 600 can include training multiple machine learning models and selecting a machine learning model of the multiple machine learning models for application based on a highest accuracy. Additionally or alternatively, multiple machine learning models can be trained and applied to generate aggregate scores for telecommunication assets. For example, a first machine learning model can be trained to generate quality scores based on an operational status of telecommunication assets, a second machine learning model can be trained to generate quality scores based on whether telecommunication assets are properly decomposed, and the first and second machine learning models can be combined to generate an aggregate quality score.

Additionally, those skilled in the art will appreciate that operations can be added to or removed from the process 600 without deviating from the teachings of the present disclosure. Furthermore, those skilled in the art will appreciate that training of the machine learning model can be performed on a substantially continuous basis, such as by training the model based on new asset data to which the machine learning model is applied and/or based on user feedback.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system for training a machine learning model to generate quality scores for telecommunication assets to facilitate telecommunication asset management, the system comprising:

at least one hardware processor; and at least one non-transitory memory carrying instructions that, when executed by the at least one hardware processor, cause the system to perform operations, the operations comprising:

receiving data related to multiple telecommunication assets, the data including a quality score for each of the multiple telecommunication assets representing a quality of the telecommunication asset, wherein the multiple telecommunication assets include one or more of: a software application, a data store, or a software platform, wherein the data related to the multiple telecommunication assets includes, for at least some of the multiple telecommunication assets, a hierarchy comprising an asset group associated with the telecommunication asset, the asset group relating to an operational activity of a telecommunication service provider, and a set of deployable units included in the telecommunication asset, the set of deployable units including a microservice, an application programming interface (API), or a database component, and wherein the quality score for each of the multiple telecommunication assets is based on an operational status of the telecommunication asset and whether the telecommunication asset is hierarchically decomposed;

generating, using the data related to the multiple telecommunication assets, a training dataset, wherein at least one characteristic of each telecommunication asset is identified, the at least one characteristic relating to the operational status of the telecommunication asset, presence or absence of a hierarchical decomposition of the telecommunication asset, or both; and training, using the generated training dataset, a machine learning model to generate quality scores for received telecommunication assets based, at least in part, on operational information associated with the received telecommunication assets, hierarchical information associated with the received telecommunication assets, or both.

2. The system of claim 1:

wherein the hierarchy includes, for at least some of the deployable units in the set of deployable units, one or more deployable instances implementing on a computing device.

3. The system of claim 1:

wherein the hierarchy includes, for at least some of the deployable units in the set of deployable units, one or more deployable instances implementing on a computing device, and wherein the one or more deployable instances is associated with an environment in which the one or more deployable instances is implementing, a physical location of the computing device, or both an environment and a physical location.

4. The system of claim 1, wherein the operations further comprise:

applying the trained machine learning model to generate a quality score for a new telecommunication asset.

5. The system of claim 1, wherein the operations further comprise:

applying the trained machine learning model to generate a first quality score for a new telecommunication asset at a first time;

applying the trained machine learning model to generate a second quality score for the new telecommunication asset at a second time; and causing display, in a graphical user interface (GUI), of the second quality score and an indication of a difference between the second quality score and the first quality score.

6. The system of claim 1, wherein quality scores generated using the trained machine learning model indicate an impact of score telecommunication assets on one or more revenue-generating activities of the telecommunication service provider.

7. The system of claim 1, wherein the operations further comprise:

receiving, via a graphical user interface (GUI), an asset group for a new telecommunication asset;

receiving, via the GUI, parameters for the new telecommunication asset, wherein the parameters for the new telecommunication asset include at least one of a location or an access credential;

receiving, via the GUI, at least one deployable unit for the new telecommunication asset; and applying the trained machine learning model to generate a quality score for the new telecommunication asset.

8. The system of claim 1, wherein the operations further comprise:

evaluating the trained machine learning model using a testing dataset, wherein the testing dataset includes asset data associated with telecommunication assets, the asset data including quality scores for the telecommunication assets; and retraining the machine learning model when accuracy of the machine learning model does not exceed a threshold accuracy, wherein retraining the machine learning model includes at least one of: training the machine learning model at least a second time using the generated training dataset, resampling at least a portion of the generated training dataset, or training the machine learning model using a different dataset.

9. At least one non-transitory computer-readable medium, excluding transitory signals, carrying instructions that, when executed by a computing system, cause the computing system to perform operations to generate a quality score for a telecommunication asset to facilitate telecommunication asset management, the operations comprising: receiving, via a graphical user interface (GUI) an asset type for a telecommunication asset, wherein the telecommunication asset comprises a software application, a software platform, or a data store; dynamically displaying, in the GUI, at least one input field corresponding to at least one parameter for the telecommunication asset, wherein the at least one parameter for the telecommunication asset includes a location for the telecommunication asset, access credentials for the telecommunication asset, or both;

receiving, via the at least one input field, the at least one parameter for the telecommunication asset; receiving hierarchical information for the telecommunication asset, wherein the hierarchical information includes an asset group to which the telecommunication asset belongs, the asset group corresponding to a unit or activity of a telecommunication service provider; accessing a set of deployable units included in the telecommunication asset, wherein the set of deployable units includes at least one of a microservice, an application component, a software module, or an application programming interface; generating, using the telecommunication asset, the hierarchical information, and the set of deployable units, a hierarchical representation of the telecommunication asset; and generating, based at least in part on the hierarchical representation of the telecommunication asset, a quality score for the telecommunication asset.

10. The at least one non-transitory computer-readable medium of claim 9, wherein the operations further comprise: receiving, via an application programming interface (API), a request for asset data associated with the telecommunication asset, wherein the asset data includes the hierarchical representation of the telecommunication asset; and providing the asset data associated with the telecommunication asset in response to the request.

11. The at least one non-transitory computer-readable medium of claim 9, wherein the operations further comprise: providing access, via an application programming interface (API), to a deployable unit of the set of deployable units.

12. The at least one non-transitory computer-readable medium of claim 9: wherein the hierarchical representation of the telecommunication asset includes at least one deployable instance of a deployable unit of the set of deployable units, and wherein the at least one deployable instance is associated with a physical location or an environment where the at least one deployable instance is implementing.

13. The at least one non-transitory computer-readable medium of claim 9: wherein the quality score for the telecommunication asset is generated using a machine learning model that is trained using a training dataset, wherein the training dataset is generated by the computing system using data related to multiple telecommunication assets, the data including a quality score for each of the multiple telecommunication assets, wherein the data related to the multiple telecommunication assets includes, for at least some of the multiple telecommunication assets, a hierarchical representation comprising an asset group associated with the telecommunication asset, the asset group relating to an operational activity of a telecommunication service provider, and a set of deployable units included in the telecommunication asset, the set of deployable units including a microservice, an application programming interface (API), or a database component, and wherein the quality score for each of the multiple telecommunication assets is based on an operational status of the telecommunication asset and whether the telecommunication asset is hierarchically decomposed.

14. The at least one non-transitory computer-readable medium of claim 9, wherein the quality score for the telecommunication asset is generated at a first time, and wherein the operations further comprise: generating a second quality score at a second time; and causing display, in a graphical user interface (GUI), of the second quality score and an indication of a difference between the second quality score and the quality score.

15. At least one non-transitory computer-readable medium, excluding transitory signals, carrying instructions that, when executed by a computing system, cause the computing system to perform operations to generate quality scores for telecommunication assets to facilitate telecommunication asset management, the operations comprising: receiving data related to multiple telecommunication assets, the data including a quality score for each of the multiple telecommunication assets representing a quality of the telecommunication asset, wherein the multiple telecommunication assets include at least one of a software application, a data store, or a software platform, wherein the data related to the multiple telecommunication assets includes, for at least some of the multiple telecommunication assets, a hierarchy comprising an asset group associated with the telecommunication asset, the asset group relating to a business activity of a telecommunication service provider, and a set of deployable units included in the telecommunication asset, the set of deployable units including a microservice, an application programming interface, or a database component, and wherein the quality score for each of the multiple telecommunication assets is based on an operational status of the telecommunication asset and whether the telecommunication asset is hierarchically decomposed; generating, using the data related to the multiple telecommunication assets, a training dataset, wherein at least one characteristic of each telecommunication asset is identified, the at least one characteristic relating to the operational status of the telecommunication asset, presence or absence of a hierarchical decomposition of the telecommunication asset, or both; and training, using the generated training dataset, a machine learning model to generate quality scores for received telecommunication assets based, at least in part, on operational information associated with the received telecommunication assets, hierarchical information associated with received telecommunication assets, or both.

16. The at least one non-transitory computer-readable medium of claim 15: wherein the hierarchy includes, for at least some of the deployable units in the set of deployable units, one or more deployable instances implementing on a computing device.

17. The at least one non-transitory computer-readable medium of claim 15: wherein the hierarchy includes, for at least some of the deployable units in the set of deployable units, one or more deployable instances implementing on a computing device, and wherein the one or more deployable instances is associated with a physical location of the computing device.

18. The at least one non-transitory computer-readable medium of claim 15: wherein the hierarchy includes, for at least some of the deployable units in the set of deployable units, one or more deployable instances implementing on at least one computing device, and wherein the one or more deployable instances is associated with an environment in which the one or more deployable instances is implementing.

19. The at least one non-transitory computer-readable medium of claim 15, wherein the operations further comprise: applying the trained machine learning model to generate a first quality score for a new telecommunication asset at a first time; applying the trained machine learning model to generate a second quality score at a second time; and causing display, in a graphical user interface (GUI), of the second quality score and an indication of a difference between the second quality score and the first quality score.

20. The at least one non-transitory computer-readable medium of claim 15, wherein the operations further comprise: receiving, via a graphical user interface (GUI), an asset group for a new telecommunication asset; receiving, via the GUI, parameters for the new telecommunication asset, wherein the parameters for the new telecommunication asset include at least one of a location or an access credential;

receiving, via the GUI, at least one deployable unit for the new telecommunication asset;

and applying the trained machine learning model to generate a quality score for the new telecommunication asset.

\*   \*   \*   \*   \*       20